US012596793B2

(12) United States Patent
Aoki et al.

(10) Patent No.: US 12,596,793 B2
(45) Date of Patent: *\*Apr. 7, 2026*

(54) SYSTEM AND METHOD FOR PATTERN-BASED DETECTION AND MITIGATION OF COMPROMISED CREDENTIALS

(71) Applicants: RAKUTEN SYMPHONY, INC., Tokyo (JP); RAKUTEN MOBILE, INC., Tokyo (JP)

(72) Inventors: Sota Aoki, Tokyo (JP); Maheshwaran Palanivelu, Tokyo (JP)

(73) Assignees: RAKUTEN SYMPHONY, INC., Tokyo (JP); RAKUTEN MOBILE, INC., Tokyo (JP)

( * ) Notice: Subject to any disclaimer, the term of this patent is extended or adjusted under 35 U.S.C. 154(b) by 371 days.

This patent is subject to a terminal disclaimer.

(21) Appl. No.: 18/020,283

(22) PCT Filed: Dec. 28, 2022

(86) PCT No.: PCT/US2022/054145
§ 371 (c)(1),
(2) Date: Feb. 8, 2023

(87) PCT Pub. No.: WO2024/144771
PCT Pub. Date: Jul. 4, 2024

(65) Prior Publication Data
US 2024/0256652 A1 Aug. 1, 2024

(51) Int. Cl.
*G06F 21/55* (2013.01)

(52) U.S. Cl.
CPC .................................. *G06F 21/552* (2013.01)

(58) Field of Classification Search
CPC ............. H04L 63/1416; H04L 63/1425; H04L 63/1441; H04L 63/1433; H04L 2209/56;
(Continued)

(56) References Cited

U.S. PATENT DOCUMENTS 11,625,491 B1 * 4/2023 Quevedo ............... G06F 21/602
713/155
2009/0241190 A1 9/2009 Todd et al.
(Continued)

OTHER PUBLICATIONS

Bai et al., "Efficiently Weaponizing Vulnerabilities and Automating Vulnerability Hunting", Bachelor's thesis in Bachelor of Engineering in Computer Science, Norwegian University of Science and Technology, May 2022 (178 pages total).
(Continued)

*Primary Examiner* — Chris Parry
*Assistant Examiner* — Abderrahmen Chouat
(74) *Attorney, Agent, or Firm* — Sughrue Mion, PLLC

(57) ABSTRACT

Software attacks directed to compromising an insecurely-stored credential on a device may be detected and mitigated by detection of each of an initial stage and a subsequent stage through identifiers within an activity log of the device. Detection of an initial identifier indicating a possible attempt to locate an insecurely-stored credential indicates an occurrence of the initial stage. Detection, within a search window commencing upon detection of the initial stage, of a subsequent identifier indicating a possible attempt to determine context for the insecurely-stored credential indicates an occurrence of the subsequent stage. Responsive to detection of the initial stage and the subsequent stage, a response target associated with the detected identifiers is identified, and a security response associated with the response target is performed to thereby mitigate exploitation of the insecurely-stored credential.

20 Claims, 3 Drawing Sheets

(58) Field of Classification Search
    CPC ... H04L 63/0428; H04L 63/14; H04L 9/3247;
              H04L 63/1491; H04L 63/20; H04L
              63/1408; H04L 51/212; H04L 63/083;
              H04L 63/10; H04L 63/08; H04L 63/1483;
              G06F 21/554; G06F 21/577; G06F 21/64
    See application file for complete search history.

(56)                     References Cited

U.S. PATENT DOCUMENTS

| | | |
|---|---|---|
| 2011/0231564 A1 | 9/2011 | Korsunsky et al. |
| 2014/0380473 A1 | 12/2014 | Bu et al. |
| 2016/0057166 A1 | 2/2016 | Chesla |
| 2020/0145455 A1 | 5/2020 | Nandi |
| 2020/0195672 A1* | 6/2020 | Mugambi ............. H04L 63/308 |
| 2020/0285737 A1* | 9/2020 | Kraus ................... G06F 21/552 |
| 2021/0209232 A1 | 7/2021 | Shim et al. |
| 2021/0288981 A1* | 9/2021 | Numainville ....... H04L 63/1416 |
| 2022/0255926 A1 | 8/2022 | Crabtree et al. |

OTHER PUBLICATIONS

Menashe et al., "SpringShell (Spring4Shell) Zero-Day Vulnerability CVE-2022-22965 All You Need To Know", Mar. 31, 2022, pp. 1-9.

\* cited by examiner

100

300

SYSTEM AND METHOD FOR PATTERN-BASED DETECTION AND MITIGATION OF COMPROMISED CREDENTIALS

CROSS REFERENCE TO RELATED APPLICATIONS

This application is a National Stage of International Application No. PCT/US2022/054145 filed Dec. 28, 2022.

BACKGROUND

1. Field

Apparatuses and methods consistent with example embodiments relate to detection and mitigation of software attacks, and more particularly, to detection of hostile network activity indicating the seizure and compromise of an insecurely-stored credential, on the basis of patterns of identifiers which have been determined based on evaluation of similar attacks.

2. Description of Related Art

In networked computing systems, such as Internet servers and cloud-based systems, an interface for remote operation is highly useful to simplify access of the contents and reconfiguration of the settings by administrators. However, such interfaces present a risk of malicious actors attempting to breach the system. A credential-based access approach is typically used to prevent such breaches: a valid user supplies a password or other credential exclusively known to or possessed by them, proving their identity, and then may have access to files and functions of the system permitted for the user. However, this approach is limited in that, if the credentials of a valid user are compromised, the system is vulnerable until those credentials are invalidated.

As certain operating systems, such as Linux and Linux variants, are particularly common for networked computing systems, available public commands and features can be predicted by a malicious actor. Certain such commands can be exploited to locate insecure copies of credentials in the system.

SUMMARY

It is an object of the disclosed system and method to accurately detect malicious network activity indicating the compromising or attempted compromising of a insecurely-stored user credential.

It is another object of the disclosed system and method to reduce the number of false positives in detecting such activity without significantly increasing the number of false negatives.

It is yet another object of the disclosed system and method to prevent or mitigate attacks making use of compromised credentials by rapidly detecting such activity, enabling prompt invalidation of the compromised credentials or other measures.

In accordance with certain embodiments of the present disclosure, a method is provided for detection and mitigation of software attacks compromising an insecurely-stored credential on a monitored device. The method includes, by at least one processor, detecting an occurrence of an initial stage of an attack pattern definition by detecting at least one initial identifier associated with the initial stage within an activity log of the monitored device. The at least one initial identifier indicates a possible attempt to locate an insecurely-stored credential on the monitored device. The method further includes, by the at least one processor, responsive to detection of the initial stage, commencing a search window having a predetermined time duration. The method further includes, by the at least one processor, detecting an occurrence of a subsequent stage of the attack pattern definition by detecting at least one subsequent identifier associated with the subsequent stage within the activity log of the monitored device prior to an elapsing of the search window. The at least one subsequent identifier indicates a possible attempt to determine context for the insecurely-stored credential from the monitored device. The method further includes, by the at least one processor, responsive to detection of the initial stage and the subsequent stage, identifying a response target associated with the detected identifiers. The method further includes, by the at least one processor, performing a security response associated with the response target to thereby mitigate exploitation of the insecurely-stored credential.

In accordance with certain embodiments of the present disclosure, a system is provided for detection and mitigation of software attacks compromising an insecurely-stored credential on a monitored device. The system includes at least one non-volatile memory configured to store computer program code, and at least one processor configured to operate as instructed by the computer program code. The computer program code includes initial stage detection code configured to cause at least one of the at least one processor to detect an occurrence of an initial stage of an attack pattern definition by detecting at least one initial identifier associated with the initial stage within an activity log of the monitored device. The at least one initial identifier indicates a possible attempt to locate an insecurely-stored credential on the monitored device. The computer program code further includes subsequent stage detection code configured to cause at least one of the at least one processor to, responsive to detection of the initial stage, commence a search window having a predetermined time duration, and detect an occurrence of a subsequent stage of the attack pattern definition by detecting at least one subsequent identifier associated with the subsequent stage within the activity log of the monitored device prior to an elapsing of the search window. The at least one subsequent identifier indicates a possible attempt to determine context for the insecurely-stored credential from the monitored device. The computer program code further includes target identification code configured to cause at least one of the at least one processor to, responsive to detection of the initial stage and the subsequent stage, identify a response target associated with the detected identifiers. The computer program code further includes response code configured to cause at least one of the at least one processor to perform a security response associated with the response target to thereby mitigate exploitation of the insecurely-stored credential.

In accordance with certain embodiments of the present disclosure, a non-transitory computer-readable recording medium is provided, and has recorded thereon instructions executable by at least one processor to perform a method for detection and mitigation of software attacks compromising an insecurely-stored credential on a monitored device. The method includes detecting an occurrence of an initial stage of an attack pattern definition by detecting at least one initial identifier associated with the initial stage within an activity log of the monitored device. The at least one initial identifier indicates a possible attempt to locate an insecurely-stored credential on the monitored device. The method further includes, responsive to detection of the initial stage, commencing a search window having a predetermined time duration. The method further includes detecting an occurrence of a subsequent stage of the attack pattern definition by detecting at least one subsequent identifier associated with the subsequent stage within the activity log of the monitored device prior to an elapsing of the search window. The at least one subsequent identifier indicates a possible attempt to determine context for the insecurely-stored credential from the monitored device. The method further includes, responsive to detection of the initial stage and the subsequent stage, identifying a response target associated with the detected identifiers. The method further includes performing a security response associated with the response target to thereby mitigate exploitation of the insecurely-stored credential.

Additional aspects will be set forth in part in the description that follows and, in part, will be apparent from the description, or may be realized by practice of the presented embodiments of the disclosure.

BRIEF DESCRIPTION OF THE DRAWINGS

Features, aspects and advantages of certain exemplary embodiments of the disclosure will be described below with reference to the accompanying drawings, in which like reference numerals denote like elements, and wherein.

DETAILED DESCRIPTION

Figure 1:
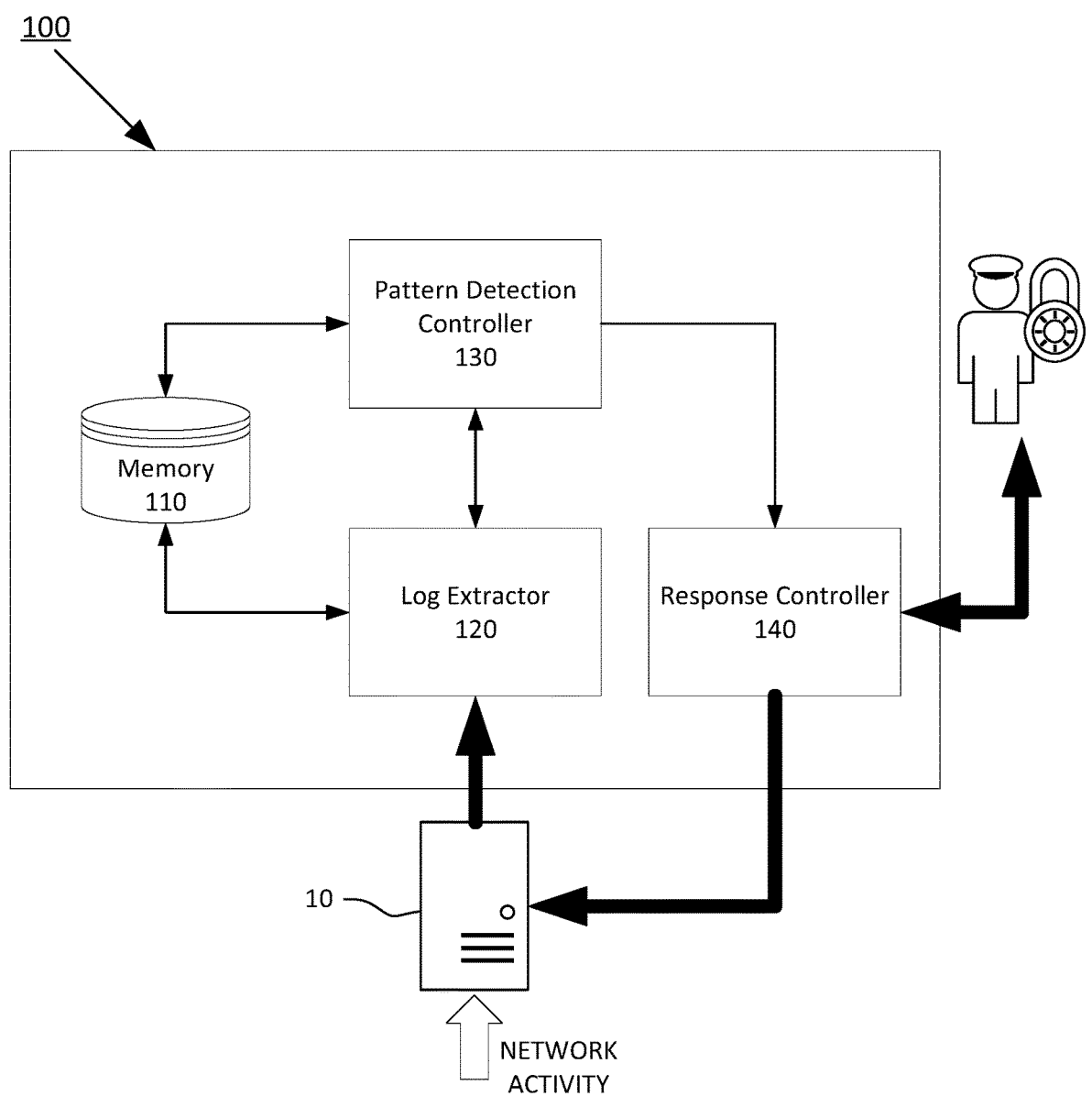
FIG. 1 is a block diagram illustrating a system for detection and mitigation of software attacks against a computer server, in accordance with an exemplary embodiment.

The following detailed description of example embodiments refers to the accompanying drawings. The same reference numbers in different drawings may identify the same or similar elements. The embodiments are described below in order to explain the disclosed system and method with reference to the figures illustratively shown in the drawings for certain exemplary embodiments for sample applications.

The foregoing disclosure provides illustration and description, but is not intended to be exhaustive or to limit the implementations to the precise form disclosed. Modifications and variations are possible in light of the above disclosure or may be acquired from practice of the implementations. Further, one or more features or components of one embodiment may be incorporated into or combined with another embodiment (or one or more features of another embodiment). Additionally, in the flowcharts and descriptions of operations provided below, it is understood that one or more operations may be omitted, one or more operations may be added, one or more operations may be performed simultaneously (at least in part), and the order of one or more operations may be switched.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware may be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Where only one item is intended, the term "one" or similar language is used. Also, as used herein, the terms "has," "have," "having," "include," "including," or the like are intended to be open-ended terms. Further, the phrase "based on" is intended to mean "based, at least in part, on" unless explicitly stated otherwise. Furthermore, expressions such as "at least one of [A] and [B]" or "at least one of [A] or [B]" are to be understood as including only A, only B, or both A and B.

As described briefly in the Background, copies of credentials, in particular passwords and secure shell (SSH) keys, are sometimes stored insecurely in a system, such that even a user with only low-level or public-level access to the system can still locate the copies. If this user is a malicious actor, they can store this credential to their own system, and then gain the access level of the valid owner of the credential. This in turn might enable any number of malicious attacks, including but not limited to the copying or altering of secured data, the installation of "backdoors" or other means of compromising the larger system, and destructive actions such as installation of a virus or direct deletion of content.

As an example of insecurely-stored credentials, a password may be stored to a file in a local file system or remote file share, deliberately or inadvertently. These can be files created by users to store their own credentials, shared credential stores for a group of individuals, configuration files containing passwords for a system or service, or source code/binary files containing embedded passwords. Moreover, users often type their usernames, keys, and passwords on the command-line as parameters to programs, which are then saved to a command history, such as a bash history, when they log out. Malicious actors can abuse this by searching such files and histories for potential machine identities and credentials.

Preventing such storage of credentials is a matter of user discipline, which as a practical matter cannot be relied on. And it is difficult to prevent searches for such stored credentials without unduly disabling important system features. However, by detecting when such searches lead to the compromising of a credential, a security system or security administrator can prevent the malicious actor from making effective use of the credential. For example, the compromised credential may be disabled or the corresponding user account may be reconfigured, making the stolen copy useless. The source of the malicious activity may also be identified by said activity, and then locked out of the system by other means. Additionally, if the credential has already been used on a particular targeted system and made insecure, or is at risk of being made insecure, said system may be re-secured by limiting network access thereto until the threat is resolved. Any of these responses may be performed automatically by a security system on detection of the search, or manually by a security administrator in response to a detection alert, as suitable to the needs of the system. Which response is selected may be in part dependent on what elements of the attack could be identified most easily and be used as a target of the response: the compromised credential, the source of the network activity, the targeted system, or some other element enabling another form of response.

Plainly, prompt detection of these malicious searches is important to prevent or otherwise mitigate exploitation of a compromised credential. However, the detection must be accurate. A false negative will allow a compromised credential to remain undetected. On the other hand, a false positive is not desirable either. In an automated system, a false positive will lead to a valid user being locked out of valid activity, resulting in frustration and potential harm. In a manual system, a false positive requires investigation of a threat that does not exist, wasting time and potentially distracting from actual threats.

Existing detection approaches generate an excessive rate of false positives. This makes an automated system impractical, and requires unnecessary man-hours of investigation to confirm that the false positives are not actual threats. A more accurate detection approach is needed.

Briefly, example embodiments of the present disclosure provide a method and system in which attempts to compromise credentials are detected while in progress, such that a response can be executed to prevent, mitigate, or otherwise defend against use of a compromised credential in a prompt manner.

Embodiments of the disclosure more specifically detect network activity indicating a search by a malicious actor for an insecurely-stored credential, or indicating the seizure or other compromising of such a credential, before the credential can be used effectively. For convenience and brevity, both the search activity and the compromising of the credential will be considered an "attack" on the system for the purposes of this disclosure, and any description of "detection of an attack" will include detection of either activity. As such, responses to "detection of an attack" include responses which prevent the credential from being used successfully to do harm to the system.

Detection of an attack is made possible by the disclosed system and method when particular characteristics or identifiers of the attack are known and form a pattern or scenario. The identifiers of the attack can be defined in terms of entries in server activity logs generated by the attack, using a regular expression or other search parameter. By using search parameters as definitions, the identifiers can be recognized in the logs through conventional automated searching processes.

Other approaches which use generic identifiers, especially without a specified pattern, can result in excessive false positives. This in turn wastes time, energy, and resources in investigating what turns out to be legitimate network activity. Embodiments of the present system and method therefore define identifiers of the attack, and especially the nature of the pattern, as specifically as possible.

In certain embodiments, a pattern of attack for compromising an insecurely-stored credential can be defined in part by a plurality of stages which occur in a particular sequence, and attack identifiers can be in part characterized by the stage of the attack in which they appear or are detectable. As such, certain identifiers will be described herein by their associated stage.

Once an attack is detected, a notification (e.g. a generated alert message) can be sent to a security administrator, communicating that a software attack is impending or in progress. Additionally, one or more security responses can be executed to halt or mitigate the attack, targeted to various levels according to the contents of the activity logs. A security response can be executed manually by the security administrator. A security response can also, or alternatively, be executed automatically responsive to the detection of particular types of events, or the notifications resulting from the detection, without manual intervention.

Possible security responses can be analytical or defensive in nature. Analytical responses can include, but are not limited to: verification by secondary means that the network activity is unexpected and/or undesired; review of network connection logs associated with a potentially targeted host system to identify activity enabled by a compromised credential; review of the file system of a potentially targeted host system for unknown executables, scripts, or other potentially malicious code; review of inbound and outbound network connections; and generating a report or alert identifying a source of potentially malicious activity. Defensive responses can include, but are not limited to: denying system access requests made by a source of potentially malicious activity; disabling or limiting access for a potentially compromised user account; adding the source of potentially malicious activity or the potentially compromised user account to a blacklist; and disabling some or all network connections and/or functions of the potentially targeted host system. It is noted that the information gathered from analytical responses can be used to enable selection of further appropriate security responses, themselves either analytical or defensive.

The source of potentially malicious activity can be identified from the activity log according to various attributes associated with the identifier entries. For example, an entry in the activity log may include an IP address, hostname, or username, which can be used to identify the source of the activity indicated by the entry. The entry may also be used to identify the data gathered as part of the activity, which can be used to determine what accounts or systems might have been compromised. The locations of the identifying entries in the activity logs, and/or the entry contents, can be included as part of the attack notification to enable such analysis.

A system for detection and mitigation of software attacks on the basis of an attack pattern definition, in accordance with an exemplary embodiment, will now be described with reference to FIG. 1.

A system 100, as illustrated in FIG. 1, is communicatively coupled to one or more servers 10 or other devices to be monitored by the system 100. For convenience of depiction, only one server 10 is illustrated, but it will be understood that the system 100 can be coupled to any arbitrary number of servers and other devices. The system 100 and the servers 10 are coupled through any suitable network, which can include but is not limited to the Internet, a local wireless network, or a local wired network. The servers 10 each receive instructions and other network activity transactions from both the system 100 and from an arbitrary number of other devices (devices not depicted), and provide responses. The instructions are also stored by the servers 10 as entries in corresponding activity logs, which have a defined searchable format and which include a timestamp associated with each stored entry. Each stored entry may also include information about the source of an instruction, such as an IP address, hostname, or username.

The system 100 includes a memory 110, a log extractor 120, at least one pattern detection controller 130, and a response controller 140. In certain embodiments, the log extractor 120, pattern detection controller 130, and response controller 140 are software modules executing on a processor (not depicted) of the system 100.

The memory 110 stores data, which can have the format of a database or other data storage. The data on the memory 110 includes at least one attack pattern definition which can be retrieved for reference.

Each attack pattern definition includes a plurality of identifiers. Each identifier includes a search instruction for the activity logs of the servers 10; that is, the search instruction is in a form that can be used to search for content in the activity logs. For example, if the activity logs are formatted in plain text or similar, the search instruction can be a regular expression. Other formats of activity logs may require another suitable form of search instruction, which will be known to those implementing such an activity log. For convenience of description, when an entry in an activity log is located as a result of the execution of the search instruction of an identifier, this is described herein as "detecting the identifier within the activity log."

In certain embodiments, each attack pattern definition also includes a sequence of stages, which defines a plurality of stages in a specified order. Each stage has at least one identifier associated with it. In some attack pattern definitions, each identifier included in the attack pattern definition is associated with a single stage, but this is not a requirement, and other attack pattern definitions will include identifiers which are not associated with any stage, or are associated with multiple stages.

Stages can have defined conditions under which the stage is considered to have occurred. As an example, in certain embodiments, identifier groupings or "events" can be defined in the attack pattern definition, and more specifically may be associated with one of the stages of the attack pattern definition. Each event is associated with one or more identifiers. It is noted that an identifier may be associated with more than one event, as it may be an element of more than one type of event in the pattern definition. Likewise, an event may be associated with more than one stage.

Each event also includes an indicator of how many of its associated identifiers must be detected for the event to be considered "occurring." For example, an event can indicate that it is occurring upon detection of one associated identifier, upon detection of all associated identifiers, or detection of any specified number of associated identifiers. The stage itself can also, in certain embodiments, have an indicator of how many of its associated events must be occurring for the stage itself to be considered occurring. As but one example, the conditions for a stage to occur can be defined as: if either of a first event and a second event have occurred, where the first event occurs if all five associated identifiers are detected, and the second event occurs if two of three associated identifiers are detected. It will be recognized that a variety of conditions based on events and identifiers are possible, and are within the scope of the disclosed system and method. It will also be recognized that logic other than the use of events may also be used to define conditions under which a stage has occurred.

Certain stages can also have an associated time period, although this is not a requirement. Briefly, this time period can represent either a minimum or a maximum period, according to its configuration, between the previous stage in the sequence of stages and the present stage. Use of the time period will be described in more detail later herein.

The log extractor 120 is configured to request and receive the activity logs from the servers 10. Such requests are ongoing, such that the activity logs stored in the system 100 reflect recent activity on the servers 10. The log extractor 120 can store these activity logs in the memory 110, or can have its own dedicated storage.

The log extractor 120 also searches the activity logs at the direction of the pattern detection controller 130.

The pattern detection controller 130 is configured to receive an attack pattern definition from the memory 110. In some embodiments, a separate pattern detection controller 130 will exist for each attack pattern definition, and will conduct searches according to that attack pattern definition. In such embodiments, it may not be necessary to store the attack pattern definitions as data in memory 110; instead, each attack pattern definition can be coded into the software instructions of the corresponding pattern detection controller 130.

The pattern detection controller 130 is configured to control the log extractor 120 to search the activity logs, in accordance with the identifiers of the attack pattern definition and prior search results. The pattern detection controller 130 may be configured to actuate searches in such manner periodically or on some other defined schedule; actuation of searches may also or alternatively be triggered manually by a user of the system 100. The pattern detection controller 130 receives the results of each search, and determines from the search results whether the complete attack pattern definition has been detected. If so, the pattern detection controller 130 provides notification of detection of a software attack to the response controller 140. The notification can also include other information such as relevant contents of the activity logs.

More specifically, in certain embodiments, the pattern detection controller 130 controls the log extractor 120 to search in accordance with the identifiers associated with a first or initial stage of the sequence of stages of the attack pattern definition. The pattern detection controller 130 detects an occurrence of the first stage based on the search results and the indicators, events, or other logic which define combinations of identifiers required for the stage to occur. If the first stage occurs, the pattern detection controller 130 controls the log extractor 120 to search in accordance with the identifiers associated with a second stage of the sequence of stages of the attack pattern definition. This continues until all stages in the attack pattern definition have been detected, in the order of the sequence of stages.

If a stage has an associated time period, the pattern detection controller 130 controls the log extractor 120 to search in accordance with the stage only within entries having timestamps in accordance with the time period. The time period is considered to have commenced at the latest timestamp of the identifiers detected in the detection of the previous stage, and its conclusion may be determined accordingly. If the time period is a maximum time period, when all such entries have been searched and the conditions for the stage to occur have not been found, the pattern is determined to be incomplete, and the pattern detection controller 130 returns to the first or initial stage to start over. If the time period is a minimum time period, of if a stage does not have an associated time period, the pattern detection controller 130 controls the log extractor 120 to search in accordance with the stage indefinitely, until occurrence of the stage is detected. Minimum and maximum time periods may both be associated with the same stage in certain configurations.

The response controller 140 is configured to forward the notification from the pattern detection controller 130 to a security administrator, using a suitable interface, so that the administrator can evaluate the situation and respond appropriately.

The response controller 140 is also configured to execute a security response, which can take the form of instructions to the servers 10 or to other systems (not depicted). Various possible security responses have been described herein. One or more of a plurality of available security responses can be selectively executed depending on the specific attack pattern definition used during the detection and, by extension, the specific type of software attack detected.

In certain embodiments, one or more security responses execute automatically in response to the determinations of the pattern detection controller 130, for example, responsive to receipt of the notification from the pattern detection controller 130. In other embodiments, security responses are manually executed by the instructions of a security administrator provided through a suitable interface. The response controller 140 can also automatically provide a plurality of security responses for the security administrator to select from.

Although the monitored devices 10 are described primarily herein as servers, the term is used for convenience, and the disclosure is not limited thereto. For example, in certain embodiments, the device 10 being monitored may be a personal computer or other computer system which is not configured to provide data to a network, but is nonetheless accessible through a network by the system 100. Credentials of another device, which is accessed remotely using the monitored device, may be stored on the monitored device. As personal computers are typically less secure and used less cautiously than servers, a malicious actor may seek to attack a server by compromising a credential for that server stored elsewhere.

Furthermore, it is within the scope of the disclosure that the system 100 is entirely implemented on the monitored device 10 itself, in which case the monitored device 10 need not be actively coupled to a network at all. In such cases, a malicious actor might be expected to compromise credentials on the monitored device 10 by direct, physical access. For example, the monitored device 10 might be a publically accessible terminal, or a device at risk of being physically misplaced or stolen.

A general flow of processes for detection and mitigation of software attacks on the basis of an attack pattern definition, in accordance with an exemplary embodiment, will now be described with reference to FIG. 2.

Figure 2:
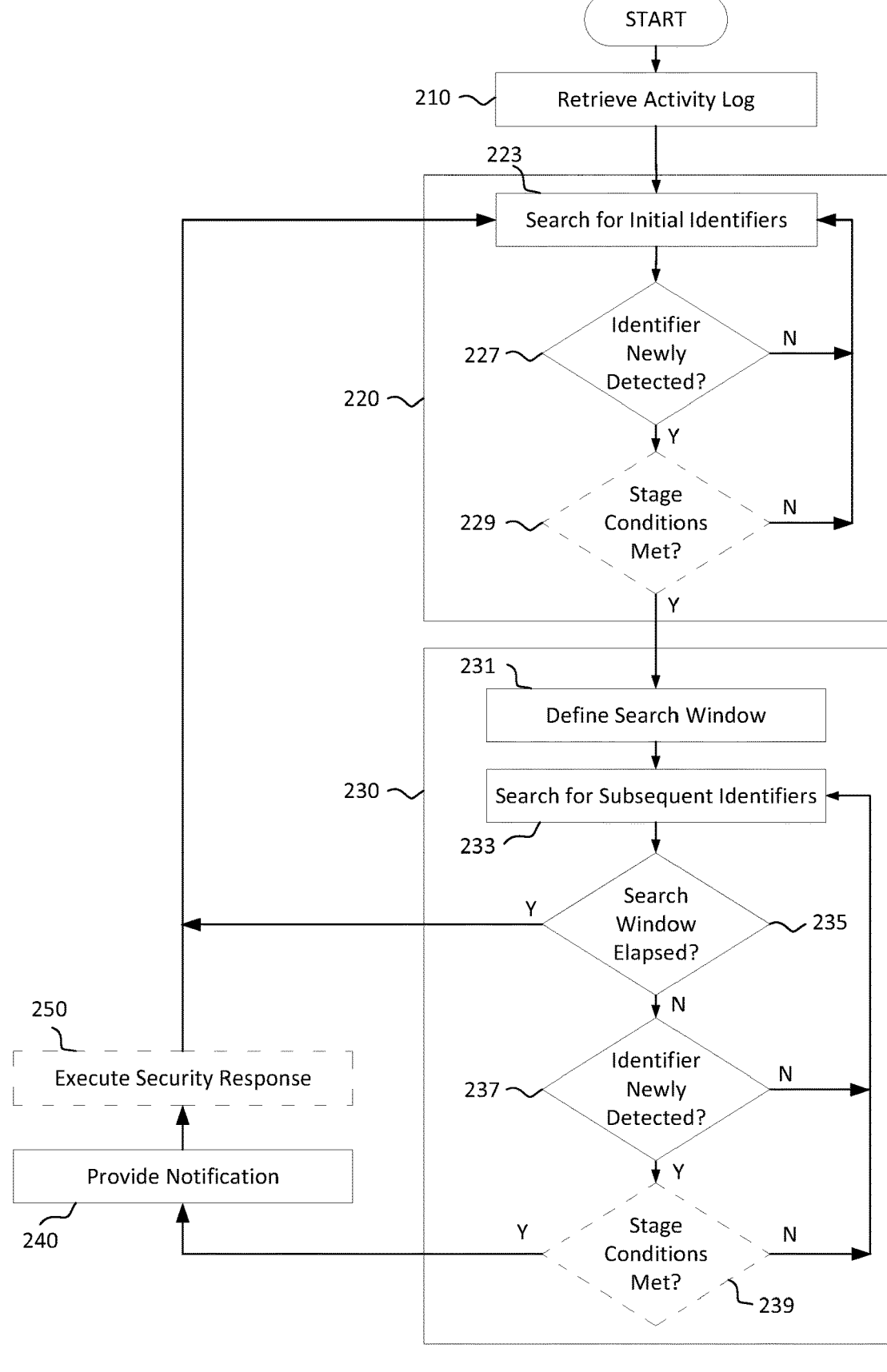
FIG. 2 is a flow diagram illustrating a flow of processes for detection and mitigation of software attacks against a computer server, in accordance with an exemplary embodiment.

The method of FIG. 2 more specifically operates according to an attack pattern definition having two stages, where an initial stage occurs upon detection of any one identifier associated with the initial stage, and a subsequent and final stage has an associated maximum time period and occurs upon detection of any one identifier associated with the subsequent stage. It is noted that an attack pattern definition reflective of attempts to locate and compromise an insecurely-stored credential is in accordance with such a method, as will be elaborated on further herein.

At 210, an activity log is retrieved from a monitored device, such as a server, for search. It is assumed that the retrieval of the log is ongoing; namely, that the retrieved log is being continuously or regularly updated in accordance with the original log on the monitored device, in an ordered manner, such that the search can proceed through entries in the order the corresponding activity occurred. In certain embodiments, the log is copied to the system and the copy of the log is searched, which in other embodiments, the log on the monitored device is simply accessed by the system and no permanent or semi-permanent copy is maintained in the system. For convenience, both possibilities will be described herein as "searching the activity log."

At 220, an attempt to detect occurrence of an initial stage of an attack pattern definition is executed.

Specifically, at 223, a search begins through the activity log for any and all identifiers associated with the initial stage. These associated identifiers may be termed "initial identifiers" for convenience. The search of the activity log may be conducted according to an entry order by timestamp.

At 227, it is determined whether an initial identifier associated with the initial stage is newly detected—that is, detected for the first time—in the activity log. If it is determined that that an initial identifier is newly detected ("Yes" at 227), the workflow continues to 229. Otherwise ("No" at 227), the workflow returns to 223 to continue the search.

At 229, it is determined whether the conditions of the initial stage have been met according to the detected initial identifiers and the conditions of the initial stage. If it is determined that that this is the case ("Yes" at 229), the workflow continues to 230. Otherwise ("No" at 229), the workflow returns to 223 to continue the search. In the example depicted method, because identification of any one initial identifier is sufficient condition for detection of the initial stage, the workflow always continues to 230, making operation 229 effectively optional. The operation is nonetheless depicted to acknowledge the conditions of detecting the initial stage, which can be modified in variation embodiments of the depicted method.

At 230, an attempt to detect occurrence of a subsequent stage of the attack pattern definition is executed.

Specifically, at 231, a search window is defined according to the time period for the subsequent stage, starting at the time of the timestamp of the last identifier detected for the initial stage (at 227) and continuing to a time a length of the associated time period later.

At 233, a search begins through the activity log for any and all identifiers associated with the subsequent stage. These associated identifiers may be termed "subsequent identifiers" for convenience. The search of the activity log may be conducted according to an entry order by timestamp.

At 235, it is determined whether the search window has "elapsed" in the search. This is determined according to whether all entries that have timestamps within the search window have been searched, and the entries searched in the most recent iteration of operation 233 are no longer in this search window. If it is determined that that the search window has not elapsed ("No" at 235), the workflow continues to 237. Otherwise ("Yes" at 235), the workflow returns to 223 and the search for identifiers of the initial stage starts over at the latest searched entry.

At 237, it is determined whether a subsequent identifier associated with the subsequent stage is newly detected—that is, detected for the first time—in the activity log. If it is determined that that a subsequent identifier is newly detected ("Yes" at 237), the workflow continues to 239. Otherwise ("No" at 237), the workflow returns to 233 to continue the search.

It is noted that the subsequent identifier may have a required factor which is dependent on the initial identifier detected in the initial stage 220. For example, in certain embodiments, a particular subsequent identifier is only treated as detected if it is associated with the same particular source as the initial identifier detected in the initial stage 220. The source for an identifier or other instruction may be determined by factors such as a user account, host, or source address. In such cases, operation 227 includes determining and storing a source of the instruction or other log entry determined to be the initial identifier, and operation 237 includes determining a source of an instruction under consideration as a subsequent identifier, and comparing that source to the stored source.

At 239, it is determined whether the conditions of the subsequent stage have been met according to the detected identifiers and the conditions of the subsequent stage. If it is determined that that this is the case ("Yes" at 239), the workflow continues to 240. Otherwise ("No" at 239), the workflow returns to 233 to continue the search. In the example depicted method, because identification of any one subsequent identifier is sufficient condition for detection of the subsequent stage, the workflow always continues to 240, making operation 239 effectively optional. The operation is nonetheless depicted to acknowledge the conditions of detecting the subsequent stage, which can be modified in variation embodiments of the depicted method.

An occurrence of each stage of the attack pattern definition, in order of the sequence of stages, has now been detected. Therefore, at 240, a notification of detection of a software attack is provided. Optionally, at 250, a pre-defined security response for the attack pattern definition is automatically executed, or manually executed by a security administrator upon further investigation of the network activity. The process then returns to 223 to detect the next attack.

Details of detection of an attempt to locate and compromise an insecurely-stored credential will now be presented.

Evaluation of the nature of such attempts has distinguished certain identifiers. Furthermore, these identifiers have been found to appear with certain relative timing. By recognizing these identifiers and the pattern of their appearance, the compromising of an insecurely-stored credential can be detected while in progress.

According to an embodiment, a pattern or scenario for detection of an attempt to compromise an insecurely-stored credential is as follows:

In a first or initial stage, an initial identifier associated with the stage appears in the activity log. An initial identifier may indicate a possible attempt to locate an insecurely-stored credential, such as a password or SSH key, on the monitored device.

An initial identifier may represent an user instruction to locate a file which is potentially related to a credential. For example, the search instruction included in this initial identifier may search for a logged command including command terms such as "locate", "find", "dpkg", and/or "grep", in combination with file name terms such as "ssh", "key", or "cert". Other search terms and combinations thereof are also within the scope of the disclosed embodiments.

An initial identifier may represent a user instruction relating to attempt to locate, access, copy, or manipulate SSH keys or other credential key files. For example, the search instruction included in this initial identifier may search for a logged command including terms such as "vi", "vim", "nano" "chmod", "cp", "scp", and/or "cat", in combination with a particular directory such as ".ssh/authorized_ keys". Other search terms and combinations thereof are also within the scope of the disclosed embodiments.

If an occurrence of an initial identifier is detected, then the initial stage of the attack is treated as detected. A plurality of initial identifiers may be associated with the initial stage, the occurrence of any one of which may indicate that the initial stage has occurred.

An initial alert is in some embodiments sent responsive to detection of the initial stage. However, detection of the initial stage alone is not conclusive, as attempting to locate a file potentially related to credentials, or to access a file potentially containing SSH keys, could easily represent legitimate behavior. Relying solely on the initial alert may therefore result in excessive false positives.

Therefore, the pattern also includes a second or subsequent stage. In the subsequent stage, a subsequent identifier associated with the stage appears in the activity log.

A subsequent identifier may indicate a possible attempt to determine context, from the monitored device, for a credential located in the initial stage. It has been determined that this is a common indicator of an attempt to compromise an insecurely-stored credential. Any credential located through the search strategies above would likely be unfamiliar to a malicious actor, and would be retrieved out of context of its use. As such, a malicious actor will need more information to determine where and how the credential is used, such as an associated username, or an address of a system to which the credential provides access. A practical means of determining this context is to review a history of the device, such as a bash history or other command history, to find past uses of the credential.

Another subsequent identifier may indicate an attempt to conceal the activity of the malicious actor on the monitored device. It has been determined that this is also a common indicator of a possible attempt to compromise an insecurely-stored credential, and is based on the desire of the malicious actor to make their actions less visible. A practical means of concealing the activity is to manipulate a history of the device, to thereby remove records of recent actions, or to prevent the recording of future actions.

Conveniently, similar search instructions may identify both types of malicious activity in an activity log.

A subsequent identifier may represent an user instruction relating to clearing the device command history. For example, the search instruction included in this subsequent identifier may search for a logged command including terms such as "unset" "export", "cat", and/or "rm", in combination with terms such as "history", "histfile", or variants thereof. Other search terms and combinations thereof are also within the scope of the disclosed embodiments.

A subsequent identifier may represent a user instruction relating to accessing the device command history, such as by viewing, moving, or copying the history. For example, the search instruction included in this subsequent identifier may search for a logged command including terms such as "unset", "cp", "mv", "cat", "vi", "nano", and/or "list", in combination with the term "bash_history". Other search terms and combinations thereof are also within the scope of the disclosed embodiments.

It is noted that each of the above subsequent identifiers will indicate both possible attempts to gather context of a seized credential and possible attempts to manipulate the device history.

It is here noted that the activity log being used in this system should be a separate file from the command history or bash history of the device, as both are common targets of manipulation as described above.

If an occurrence of an subsequent identifier is detected, then the subsequent stage of the attack is treated as detected.

A plurality of subsequent identifiers may be associated with the subsequent stage, the occurrence of any one of which may indicate that the subsequent stage has occurred.

In the pattern of the present use case, the subsequent stage has a timing requirement: it must occur within a predetermined time duration which commences with the detected occurrence of the initial stage; that is, with the detection of any initial identifier. An example of a suitable duration is sixty minutes, although this is not limiting. The timing requirement is based on the assumption that a malicious actor would follow up on the credential discovered in the initial stage of the attack within the predetermined duration, by determining its context or attempting to conceal their activity. If, after the duration elapses, occurrence of the subsequent stage has not been detected, the initial stage is treated as a likely false positive, or at least not urgent, and the system returns to its original state to search for identifiers of the initial stage once more. That is, if the subsequent stage occurs after the predetermined duration elapses, it is assumed to be unrelated to the initial stage. Then, as accessing the command history or bash history of a device could easily, on its own, represent legitimate behavior, providing an alert in response to a subsequent stage unrelated to the initial stage may result in excessive false positives.

However, the detection of the initial stage can still be logged for later review, on a less urgent basis than if the subsequent stage had been also detected. It is also noted that detection of the subsequent stage independent of the initial stage can be part of a different attack pattern definition in certain configurations, with its own set of responses.

In testing, a system using the above set of identifiers in an embodiment of the two-stage detection process of FIG. 2 consistently avoided false positives, while correctly identifying attacks and simulated attacks. In contrast, using the same set of identifiers in a single-stage detection process (that is, where detection of any one of the above identifiers was sufficient to trigger a notification), false positives were too common for the system to be used in practice.

These and related processes, and other necessary instructions, may be encoded as executable instructions on one or more non-transitory computer-readable media, such as hard disc drives or optical discs, and executed using one or more computer processors, in concert with an operating system or other suitable measures. Likewise, one or more of the above components described above may be implemented as instructions stored on a computer-readable storage medium and executable by at least one processor (and/or may include at least one processor).

These computer-readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer-readable program instructions may also be stored in a computer-readable storage medium that can direct a computer, a programmable data processing apparatus, and/or other devices to function in a particular manner, such that the computer-readable storage medium having instructions stored therein comprises an article of manufacture including instructions which implement aspects of the function/act specified in the flowchart and/or block diagram block or blocks.

The computer-readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

In a software implementation, the software may include a plurality of computer executable instructions, to be implemented on a computer system. Prior to loading in a computer system, the software may reside as encoded information on a suitable tangible, non-transitory, computer-readable storage medium, such as magnetically, optically, or other suitably encoded or recorded media. The computer-readable storage medium can be a tangible device that can retain and store instructions for use by an instruction execution device. The computer-readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer-readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing, In certain embodiments, the computer-readable storage medium may take the form of pre-existing data storage (such as "cloud storage") accessible through an operably coupled network means (such as the Internet). A computer-readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer-readable program instructions described herein can be downloaded to respective computing/processing devices from a computer-readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer-readable program instructions from the network and forwards the computer-readable program instructions for storage in a computer-readable storage medium within the respective computing/processing device.

Computer-readable program code/instructions for carrying out operations may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar. The computer-readable program instructions may execute entirely on a user's computer, partly on the user's computer, as a stand-alone software package, partly on the user's computer and partly on a remote computer or server, or entirely on the remote computer or server. In scenarios involving a remote computer or server, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer-readable program instructions by utilizing state information of the computer-readable program instructions to personalize the electronic circuitry, in order to perform aspects or operations.

In certain implementations, a system includes a dedicated processor or processing portions of a system on chip (SOC), portions of a field programmable gate array (FPGA), or other such suitable measures, executing processor instructions for performing the functions described herein or emulating certain structures defined herein. Suitable circuits using, for example, discrete logic gates such as in an Application Specific Integrated Circuit (ASIC), Programmable Logic Array (PLA), or Field Programmable Gate Arrays (FPGA) are in certain embodiments also developed to perform these functions.

Figure 3:
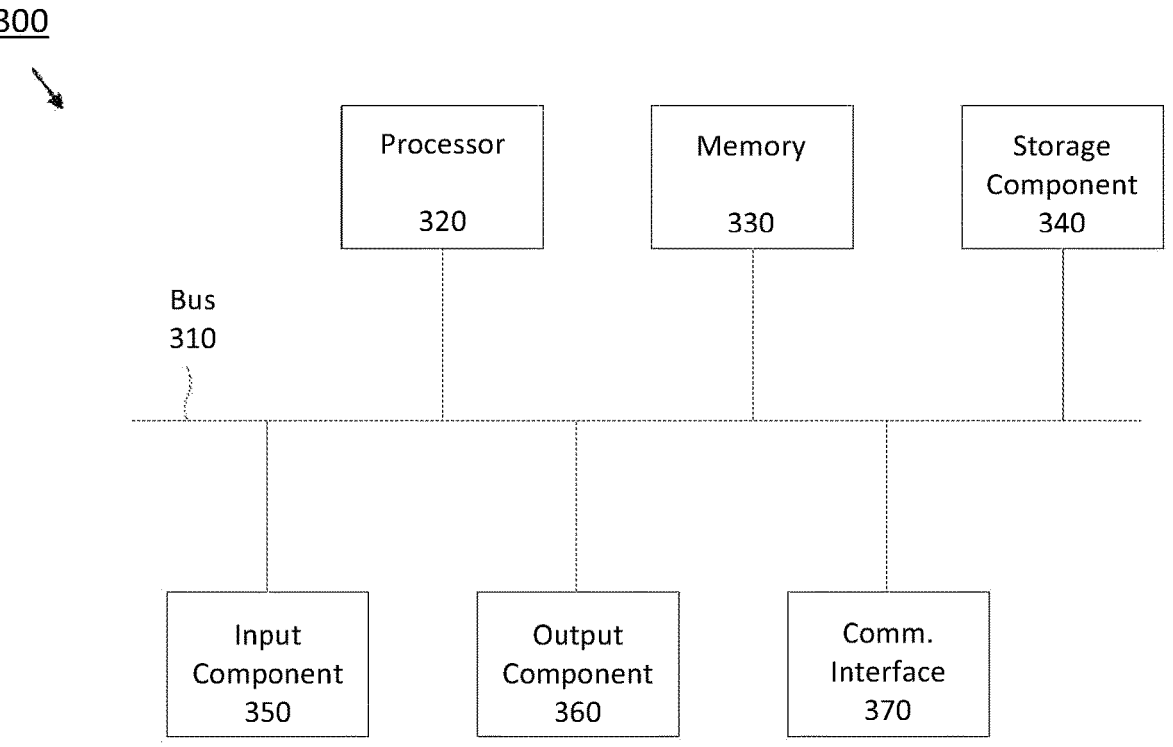
FIG. 3 is a diagram of example components of a device on which embodiments of the systems and/or methods described herein may be implemented.

FIG. 3 is a diagram of example components of a device 300. Device 300 may correspond to system 100 or server 10. As shown in FIG. 3, device 300 may include a bus 310, a processor 320, a memory 330, a storage component 340, an input component 350, an output component 360, and a communication interface 370.

Bus 310 includes a component that permits communication among the components of device 300. Processor 320 may be implemented in hardware, firmware, or a combination of hardware and software. Processor 320 may be a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, processor 320 includes one or more processors capable of being programmed to perform a function. Memory 330 includes a random access memory (RAM), a read only memory (ROM), and/or another type of dynamic or static storage device (e.g., a flash memory, a magnetic memory, and/or an optical memory) that stores information and/or instructions for use by processor 320.

Storage component 340 stores information and/or software related to the operation and use of device 300. For example, storage component 340 may include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive. Input component 350 includes a component that permits device 300 to receive information, such as via user input (e.g., a touch screen display, a keyboard, a keypad, a mouse, a button, a switch, and/or a microphone). Additionally, or alternatively, input component 350 may include a sensor for sensing information (e.g., a global positioning system (GPS) component, an accelerometer, a gyroscope, and/or an actuator). Output component 360 includes a component that provides output information from device 300 (e.g., a display, a speaker, and/or one or more light-emitting diodes (LEDs)).

Communication interface 370 includes a transceiver-like component (e.g., a transceiver and/or a separate receiver and transmitter) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, an infrared interface, a radio frequency (RF) interface, a universal serial bus (USB) interface, a Wi-Fi interface, a cellular network interface, or the like.

Device 300 may perform one or more processes described herein. Device 300 may perform these processes in response to processor 320 executing software instructions stored by a non-transitory computer-readable medium, such as memory 330 and/or storage component 340. A computer-readable medium is defined herein as a non-transitory memory device. A memory device includes memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein.

Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

In embodiments, any one of the operations or processes of FIG. 2 may be implemented by or using any one of the elements illustrated in FIG. 3.

The foregoing disclosure provides illustration and description, but is not intended to be exhaustive or to limit the implementations to the precise form disclosed. Modifications and variations are possible in light of the above disclosure or may be acquired from practice of the implementations.

The flowchart and block diagrams in the Figures illustrate the architecture, functionality, and operation of possible implementations of systems, methods, and computer readable media according to various embodiments. In this regard, each block in the flowchart or block diagrams may represent a module, segment, or portion of instructions, which comprises one or more executable instructions for implementing the specified logical function(s). The method, computer system, and computer readable medium may include additional blocks, fewer blocks, different blocks, or differently arranged blocks than those depicted in the Figures. In some alternative implementations, the functions noted in the blocks may occur out of the order noted in the Figures. For example, two blocks shown in succession may, in fact, be executed concurrently or substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware may be designed to implement the systems and/or methods based on the description herein.

What is claimed is:

1. A method for detection and mitigation of software attacks compromising an insecurely-stored credential on a monitored device, the method comprising:

by at least one processor, detecting an occurrence of an initial stage of an attack pattern definition by detecting at least one initial identifier associated with the initial stage within an activity log of the monitored device, the at least one initial identifier indicating a possible attempt to locate an insecurely-stored credential on the monitored device;

by the at least one processor, responsive to detection of the initial stage, commencing a search window having a predetermined time duration;

by the at least one processor, detecting an occurrence of a subsequent stage of the attack pattern definition by detecting at least one subsequent identifier associated with the subsequent stage within the activity log of the monitored device prior to an elapsing of the search window, the at least one subsequent identifier indicating a possible attempt to determine context for the insecurely-stored credential from the monitored device;

by the at least one processor, responsive to detection of the initial stage and the subsequent stage, identifying a response target associated with the detected identifiers; and by the at least one processor, performing a security response associated with the response target to thereby mitigate exploitation of the insecurely-stored credential.

2. The method of claim 1, wherein a plurality of initial identifiers are associated with the initial stage, the plurality of initial identifiers including:

an identifier representing an instruction to locate a file related to credentials, and an identifier representing an instruction relating to manipulation of a credential key file.

3. The method of claim 1, wherein the at least one subsequent identifier further indicates a possible attempt to conceal activity on the monitored device.

4. The method of claim 1, wherein a plurality of subsequent identifiers are associated with the subsequent stage, the plurality of subsequent identifiers including:

an identifier representing an instruction relating to clearing a command history of the monitored device, and an identifier representing an instruction relating to accessing a command history of the monitored device.

5. The method of claim 1, wherein the response target is one of a compromised credential, a source of malicious activity, and a targeted system.

6. The method of claim 5, wherein the source of malicious activity is identified based on at least one of an IP address, hostname, or username.

7. The method of claim 1, wherein the detecting of the at least one subsequent identifier includes comparing a source of an activity log entry under consideration as a subsequent identifier with a source of an activity log entry determined to be an initial identifier during the detecting of the occurrence of the initial stage.

8. The method of claim 1, wherein the monitored device is a computer server.

9. A system for detection and mitigation of software attacks compromising an insecurely-stored credential on a monitored device, the system comprising:

at least one non-volatile memory configured to store computer program code; and at least one processor configured to operate as instructed by the computer program code, the computer program code comprising:

initial stage detection code configured to cause at least one of the at least one processor to detect an occurrence of an initial stage of an attack pattern definition by detecting at least one initial identifier associated with the initial stage within an activity log of the monitored device, the at least one initial identifier indicating a possible attempt to locate an insecurely-stored credential on the monitored device;

subsequent stage detection code configured to cause at least one of the at least one processor to, responsive to detection of the initial stage:

commence a search window having a predetermined time duration, and detect an occurrence of a subsequent stage of the attack pattern definition by detecting at least one subsequent identifier associated with the subsequent stage within the activity log of the monitored device prior to an elapsing of the search window, the at least one subsequent identifier indicating a possible attempt to determine context for the insecurely-stored credential from the monitored device;

target identification code configured to cause at least one of the at least one processor to, responsive to detection of the initial stage and the subsequent stage, identify a response target associated with the detected identifiers; and response code configured to cause at least one of the at least one processor to perform a security response associated with the response target to thereby mitigate exploitation of the insecurely-stored credential.

10. The system of claim 9, wherein a plurality of initial identifiers are associated with the initial stage, the plurality of initial identifiers including:

an identifier representing an instruction to locate a file related to credentials, and an identifier representing an instruction relating to manipulation of a credential key file.

11. The system of claim 9, wherein the at least one subsequent identifier further indicates a possible attempt to conceal activity on the monitored device.

12. The system of claim 9, wherein a plurality of subsequent identifiers are associated with the subsequent stage, the plurality of subsequent identifiers including:

an identifier representing an instruction relating to clearing a command history of the monitored device, and an identifier representing an instruction relating to accessing a command history of the monitored device.

13. The system of claim 9, wherein the response target is one of a compromised credential, a source of malicious activity, and a targeted system.

14. The system of claim 13, wherein the source of malicious activity is identified based on at least one of an IP address, hostname, or username.

15. The system of claim 9, wherein the detecting of the at least one subsequent identifier includes comparing a source of an activity log entry under consideration as a subsequent identifier with a source of an activity log entry determined to be an initial identifier during the detecting of the occurrence of the initial stage.

16. The system of claim 9, wherein the monitored device is a computer server.

17. A non-transitory computer-readable recording medium having recorded thereon instructions executable by at least one processor to perform a method for detection and mitigation of software attacks compromising an insecurely-stored credential on a monitored device, the method comprising:

detecting an occurrence of an initial stage of an attack pattern definition by detecting at least one initial identifier associated with the initial stage within an activity log of the monitored device, the at least one initial identifier indicating a possible attempt to locate an insecurely-stored credential on the monitored device;

responsive to detection of the initial stage, commencing a search window having a predetermined time duration;

detecting an occurrence of a subsequent stage of the attack pattern definition by detecting at least one subsequent identifier associated with the subsequent stage within the activity log of the monitored device prior to an elapsing of the search window, the at least one subsequent identifier indicating a possible attempt to determine context for the insecurely-stored credential from the monitored device;

responsive to detection of the initial stage and the subsequent stage, identifying a response target associated with the detected identifiers; and performing a security response associated with the response target to thereby mitigate exploitation of the insecurely-stored credential.

18. The recording medium of claim 17, wherein a plurality of initial identifiers are associated with the initial stage, the plurality of initial identifiers including:

an identifier representing an instruction to locate a file related to credentials, and an identifier representing an instruction relating to manipulation of a credential key file.

19. The recording medium of claim 17, wherein a plurality of subsequent identifiers are associated with the subsequent stage, the plurality of subsequent identifiers including:

an identifier representing an instruction relating to clearing a command history of the monitored device, and an identifier representing an instruction relating to accessing a command history of the monitored device.

20. The recording medium of claim 17, wherein the detecting of the at least one subsequent identifier includes comparing a source of an activity log entry under consideration as a subsequent identifier with a source of an activity log entry determined to be an initial identifier during the detecting of the occurrence of the initial stage.

* * * * *